United States Patent [19]
Mohun

[11] Patent Number: 5,895,030
[45] Date of Patent: Apr. 20, 1999

[54] HEAVY DUTY DEVICE FOR USE IN REMOVING AND SERVICING WHEEL DRUM AND HUB ASSEMBLIES

[76] Inventor: George E. Mohun, 700 Indian Springs, Novato, Calif. 94947

[21] Appl. No.: 08/876,917
[22] Filed: Jun. 13, 1997
[51] Int. Cl.$^6$ .................................................. B60P 1/10
[52] U.S. Cl. ............................................................ 254/7 R
[58] Field of Search ........................... 254/133 R, 2 R, 254/2 B, 7 B; 269/17; 29/273; 414/426, 427, 428, 429

[56] References Cited

U.S. PATENT DOCUMENTS 5,127,638  7/1992  Kent .......................................... 269/17

FOREIGN PATENT DOCUMENTS 764773  1/1957  United Kingdom .................. 254/7 R Primary Examiner—David A. Scherbel
Assistant Examiner—Benjamin M. Halpern
Attorney, Agent, or Firm—Paul R. Martin

[57] ABSTRACT

Disclosed is a wheel drum and hub assembly remover and rotatable work stand which comprises a mobil base, an upper portion that is movably positioned with regard to the base, and means on said upper portion for engaging the lugs of a wheel drum assembly, whereby a wheel drum and hub assembly can be easily removed and taken to a remote location for servicing in shop or field, and with which all servicing can be accomplished without removal of the hub and drum assembly from the inventive device.

8 Claims, 3 Drawing Sheets

HEAVY DUTY DEVICE FOR USE IN REMOVING AND SERVICING WHEEL DRUM AND HUB ASSEMBLIES

FIELD OF THE INVENTION

This invention relates to a tool or device specifically used to remove the wheel drum and hub assemblies of motor vehicles, particularly large trucks, buses, or automobiles, aiding in the maintenance thereof.

More particularly, it relates to a mobile tool or device, sometimes called a dolly, which can be used to carry heavy wheel drum and hub assemblies of motor vehicles to locations remote from the vehicles, for purposes of maintenance.

BACKGROUND OF THE INVENTION

Large motor vehicles, including tractor-trailers, buses, and trucks, all have wheel assemblies that require maintenance on occasion. In particular, the ball bearings contained in the assemblies often have to be removed and replaced because of excessive wear. Sometimes the ball bearings fuse to the hub housings, therefore the entire assembly has to be removed in order to remove the ball bearings, creating additional problems.

The assemblies, particularly the outer housings, are generally made of cast iron or steel, are heavy, and difficult to remove, often requiring heavy lifting by the person removing them. Often, two or more people are required to assist in the removal of the assemblies for transport to remote locations where maintenance can be performed.

RELEVANT ART

Various patents have been issued relating to devices for removing wheel hubs, and for mounting wheels on hub assemblies. U.S. Pat. No. 4,304,036, Blomgren, Jr., issued Dec. 8, 1991, describes a wheel hub removing tool; U.S. Pat. No. 5,581,866, Barkus, issued Dec. 10, 1996, shows a device for lifting an automobile wheel onto an automobile body; U.S. Pat. No. 5,408,732, Anfuso, issued Apr. 25, 1995, describes a wheel hub puller used to remove a hub assembly from the axle, and U.S. Pat. No. 4,908,925 describes a heavy duty automotive wheel hub puller which is particularly suitable for use when the ball bearings have fused to the housing, and the entire assembly needs to be removed as one piece for servicing.

The aforementioned devices are insufficient because they describe tools useful for removing a hub or wheel assembly, but do not provide means for transporting the hub assembly after removal from the vehicle, to the location where it is to be serviced.

OBJECTS OF THE INVENTION

What is needed is a device which can be used for the dual purpose of removing the hub assembly from the axle of the vehicle, and transporting it to the location where maintenance is to be performed without having to remove it from the device.

The present invention provides an easy and convenient means of removing the wheel drum and hub assembly of large trucks, buses, or automobiles in order to facilitate maintenance of the drum and hub assembly including replacement of the inner bearing race and outer bearing race.

It is, consequently, a principal object of the present invention to provide a wheel drum and hub removal means which does not require heavy lifting in removing the assembly.

It is also a principal object of the present invention to provide a means to enable control and easy manipulation of the wheel drum and hub assembly for maintenance work in the shop or field.

It is further an object of the present invention to provide a wheel drum and hub remover to different sized drum and hub assemblies.

It is a further object of the invention not only to provide a means of easy removal and replacement of the drum-hub assemblies from the vehicle but also for the device to act as a "stand" for the same by allowing the device, with the attached hub-assembly, to be rotated 90 degrees in either direction, to a horizontal and stable position, thereby facilitating removal and replacement of the inner and outer bearing races in the hub.

Further objects will become evident hereinafter.

SUMMARY OF INVENTION

The tool or device of the present invention relates generally to wheel drum and hub removers. Specifically, this invention relates to a wheel drum and hub removal tool that is mobile and allows maintenance of the wheel drum and hub assembly without removing the assembly from the device.

The wheel drum and hub remover has a height-adjustment screw which raises or lowers the supports upon which the wheel drum and hub assembly are situated after removal, thus providing variable size assemblies to be removed. The base of the invention is equipped at one end distally with wheels which enable easy mobility of the drum and hub assembly when it is braced on the supports. The other end of the base provides stability and support when the device is at rest. The device of the invention also includes a handle-receiver for control and maneuverability of it.

BRIEF DESCRIPTION OF THE DRAWINGS

For the purposes of illustrating the invention, there are shown in the drawings embodiments which are presently preferred; however, it should be understood that the invention is not limited to the precise arrangements and instrumentalities shown.

DETAILED DESCRIPTION OF THE PREFERRED EMBODIMENTS

The following detailed description is the best presently contemplated mode of carrying out the present invention. The mode as presented is not intended in any way to limit or restrict the nature of the invention, but is submitted solely for the purpose of illustrating the general principles of the invention.

Figure 1:
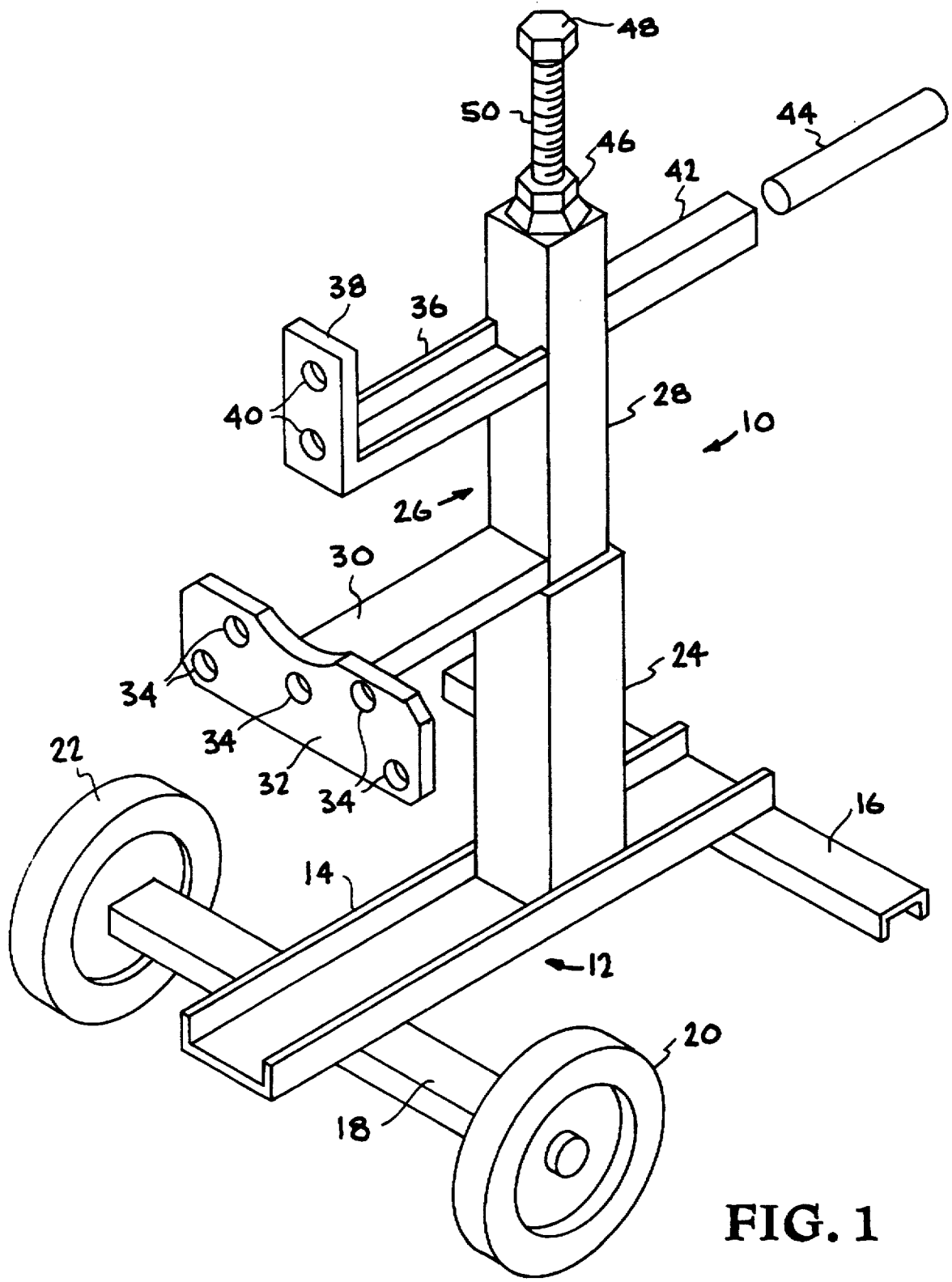
FIG. 1 is a perspective view of the heavy duty wheel drum and hub puller apparatus of the invention including the base wheel assembly.

Referring now to the drawings in detail, the device or apparatus of this invention is shown in its entirety in FIG. 1. The apparatus 10 comprises a base 12 consisting of a horizontally extending upwardly inverted channel 14, U-shaped in cross section, having a first downwardly inverted horizontally extending channel 16, U-shaped in cross section, mounted transversely at one end thereof, and a second downwardly inverted horizontally extending channel 18, U-shaped in cross section, mounted transversely close to the opposite end thereof. The channels 14, 16, and 18 are preferably made of steel, or cast iron, but could be made of any strong structural material, including aluminum. It is not mandatory that they be U-shaped in cross section, but can be any shape permitting strong, rigid, supporting members.

A pair of wheels, 20 and 22, are mounted at opposite ends of the inverted channel 18, and connected by means of an axle running underneath the channel 18, not shown. A hollow tube 24, square shaped in cross section, is positioned vertically on the upwardly inverted channel 14 and affixed thereto, at a point about midway along the length of the channel 14, and is open at the upper end for receiving the movable portion 26 of the apparatus.

Figure 3:
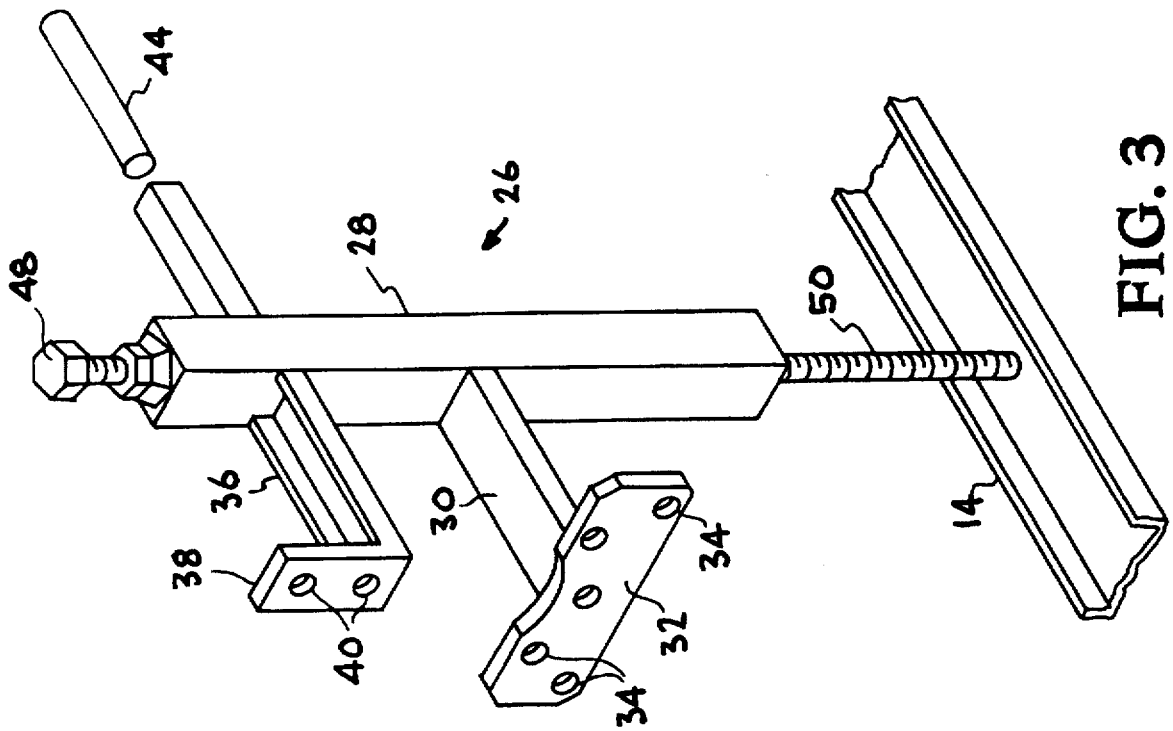
FIG. 3 is an enlarged view of the moveable top section of the heavy duty wheel drum and hub puller apparatus of the invention with portions cut away.
Figure 2:
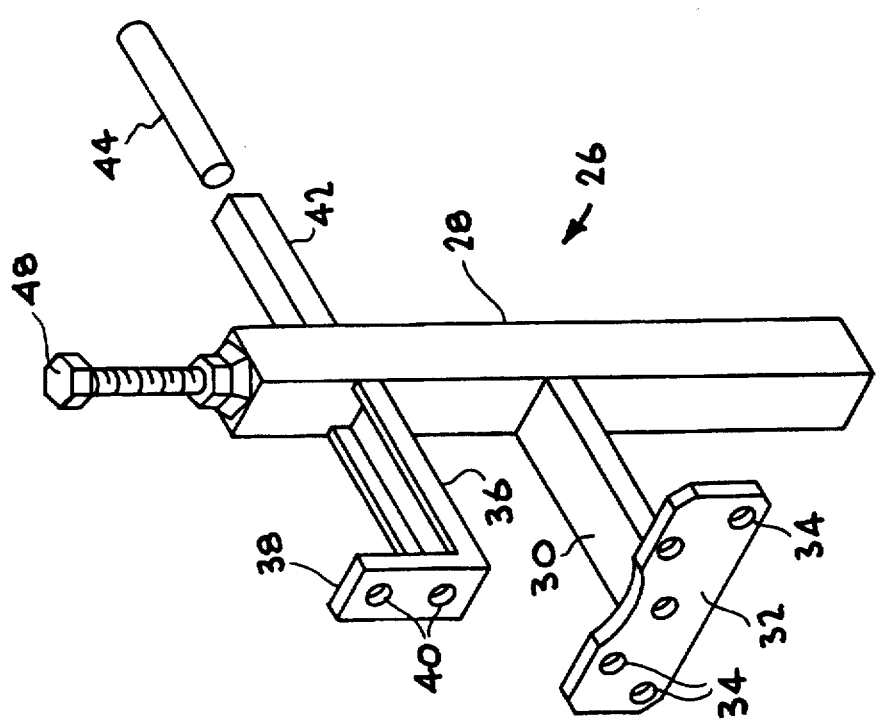
FIG. 2 is a perspective view of the moveable top section of the heavy duty wheel drum and hub puller apparatus of the invention detached from the base wheel assembly.

The movable portion 26 of the apparatus, shown in detail in FIGS. 2 and 3, comprises a vertically situated hollow tube 28, square in cross section, having dimensions such that the lower end of it it is adapted to slip into the upper end of the tube 24. The tube 28 has a horizontally projecting first support arm 30 extending forwardly from that side closest to the wheels 20, 22. In resting state, the support arm 30 rests on upper lip of the tube 24. Situated at the distal end of the support arm 30, is a transversely mounted horizontally extending flange plate 32, having a plurality of holes 34, cut into it. The holes are positioned so that they conform in general to the lugs projecting from a wheel and axle assembly of a vehicle, not shown. The support arm 30 is situated at about the midpoint on the tube 28. Toward the upper end of the tube 28 is a second support arm 36 extending horizontally from the tube. The second support arm 36 has a vertically extending flange plate 38 mounted on the end thereof having a plurality of holes 40 cut into it. These holes are also adapted to receive the lugs projecting from a wheel and hub assembly of a vehicle.

A tubular handle-receiver 42 is mounted on the side of the vertical tube 28 opposite to the second support arm 36, and extends horizontally therefrom. A handle 44 can be inserted in the handle-receiver 42 to provide leverage.

Affixed to the top of the tube 28, and closing off the upper end thereof is a nut 46 through which is threaded a height adjusting screw 48. The shaft 50 of the screw 48 is longer than the combined lengths of the tubes 28 and 24, and its distal end rests on the toop surface of channel 14 (FIG. 3). Thus, when the screw 48 is rotated within the nut 46, the movable section 26 of the apparatus of the invention raises or lowers, depending on which direction the screw 48 is rotated. This enables the holes 34 and 40 to be positioned to receive the lugs of hub assemblies situated at various levels off the ground.

In operation, the apparatus of the invention is grasped by the handle 44 inserted in the handle-receiver 42 and rolled up to the site where the wheel and hub assembly is to be removed. The position of the moveable member 26 is adjusted with the height adjusting screw 48 so the holes, 34 and 40, correspond with the lugs projecting from the hub assembly (not shown). The apparatus is then positioned so that the lugs project through the holes 34 and 40, and the lugs are secured by the lug nuts placed on the lugs on the backsides of the flange plates 32 and 38. The hub assembly is then pulled off the axle and transported while on the apparatus 10 to the site where maintenance is to be performed. If desired, in order to facilitate removal of the bearings, the device can be rotated on the wheels 90 degrees, to a horizontal and stable position, one end resting on the distal end of the handle-receiver 42, after rotation.

After maintenance is complete, the reverse procedure is undertaken. That is, the apparatus 10 with the assembly in place is rolled up to the vehicle, the assembly placed back on the axle, and the lug nuts removed from the lugs. The apparatus is backed off leaving the hub assembly in place on the vehicle.

Figure 4:
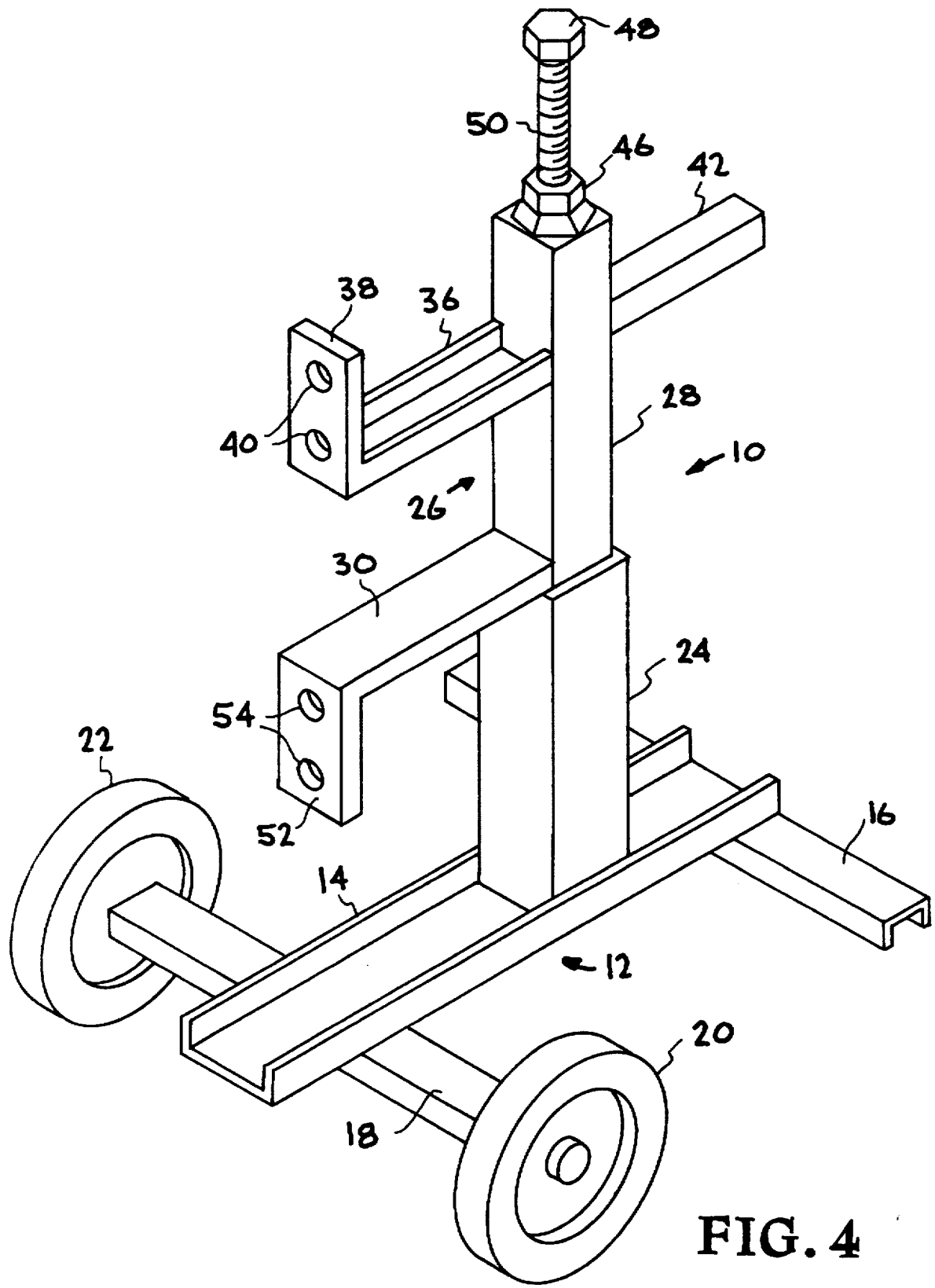
FIG. 4 is a perspective view of an alternative embodiment of the invention.

An alternative embodiment of the invention is shown in FIG. 4. In the alternative embodiment, the lower support arm 30, has a flange 52 mounted on the end thereof at a right angle to the support arm, and extends downwardly from the end thereof. The flange 52 has holes 54 in it which are also adapted to receive the lugs projecting from a wheel and hub assembly.

While particular embodiments of the invention have been described herein, it will be understood that the invention is not limited thereto, since many modifications may be made, and it is therefore contemplated to cover any such modifications as fall within the true spirit and scope of the invention.

I claim:

1. A wheel drum and hub assembly removal device comprising:
    (a) base means comprising a horizontally situated elongated member said elongated member having an upper surface, transversely mounted members at or near each end of said elongated member, one of the transversly mounted members having a set of wheels affixed thereto for providing mobility to said device, a first vertically situated tube affixed to the upper surface of said elongated member at a position approximately at the midpoint of said elongated member,
    (b) a movable portion comprising a second vertically situated tube, a lower support arm projecting horizontally from said second tube at approximately the midpoint thereof having first flange means with holes therein mounted transverse to said arm at the end thereof, an upper support arm projecting horizontally from said second tube having second flange means with holes therein mounted transverse to the end of said arm at the end thereof, a handle affixed to said second tube projecting horizontally from said second tube in a direction opposite to said upper support arm, a nut affixed with the upper end of said second tube, a bolt threaded through said nut and extending downward through said second tube, the shaft of said bolt resting on the upper surface of said elongated member, said second tube slidably positioned with said first tube, whereby when said bolt is rotated, the movable portion raises or lowers relative to said elongated member depending on which direction the bolt is rotated.

2. The device of claim 1 wherein said first flange means mounted transversely on the end of said lower support arm compasses a vertically oriented first plate.

3. The device of claim 1 wherein said second flange means mounted transversely on the end of said upper support arm compasses a vertically oriented second plate.

4. The device of claim 1, wherein said pair of wheels are positioned at each end of a axle running underneath said transverse member.

5. The device of claim 1, wherein the shaft of said bolt has a length greater than the combined lengths of said upper and lower tubes, when said lower support arm is resting on the lip of said lower tube.

6. The device of claim 1 wherein the holes in said first and second flange means are positioned so that lugs on a wheel assembly to be removed pass through said holes when said device and said assembly are brought into relation with each other.

7. The device of claim 1 wherein said elongated base members are U-shaped in cross section.

8. The device of claim 1 wherein said tubes are square in cross section.

* * * * *